United States Patent [19]
Levillain et al.

[11] Patent Number: 5,885,680
[45] Date of Patent: Mar. 23, 1999

[54] ELECTRIC ISOLATOR AND ITS MANUFACTURING METHOD

[75] Inventors: Roger Levillain, St Yorre; Gilles Bourdier, Randan, both of France

[73] Assignee: Sediver Societe Europeene d'Isolateurs en Verre et Composite, Nanterre Cedex, France

[21] Appl. No.: 551,808
[22] Filed: Nov. 7, 1995
[51] Int. Cl.$^6$ ................................................. H01B 17/50
[52] U.S. Cl. ........................... 428/60; 428/120; 428/377; 156/191; 156/194; 156/195; 174/209; 174/212
[58] Field of Search ..................................... 156/191, 194, 156/195, 185, 187; 264/281; 428/60, 120, 377; 174/137 R, 40 R, 212, 209

[56] References Cited

U.S. PATENT DOCUMENTS 4,661,184  4/1987  Klay ........................................ 156/185

FOREIGN PATENT DOCUMENTS

659907A5  2/1987  Switzerland .

Primary Examiner—Alexander Thomas
Attorney, Agent, or Firm—Sughrue, Mion, Zinn, Macpeak & Seas, PLLC

[57] ABSTRACT

The electric isolator (1) is manufactured from a support (2) made of laminated material and a continuous band made of elastomeric material (3) wound in several contiguous successive turns around the support on an outer face (20) thereof so as to make an isolating coating in the form of a plurality of annular flanges (16, 17, 18). The continuous band is profiled so as to have, in section, a basis used as a contact surface with the support outer surface, an upper face provided with at least one flange extending transversally to the basis, a first and a second side surfaces which continue the basis by forming a certain angle therewith. The first side surface of the band is brought directly in superposing contact with the second side surface of the band during the winding of the band in turns and while leaving the elastomeric material raw at the level of the first and second side surfaces and a pressure is applied towards the support on at least a portion of the upper face of the band along a slot (10) created between the first and second side surfaces so as to assemble the two surfaces. Thus, the outer surface of the elastomeric coating has no joint between the annular flanges (16, 17, 18).

8 Claims, 3 Drawing Sheets

ELECTRIC ISOLATOR AND ITS MANUFACTURING METHOD

The invention relates to a method for manufacturing an electric isolator used, for example, as a support for devices and conductors, as a device and bushing cover in high-voltage facilities.

An electric isolator as mentioned above and its manufacturing method are disclosed in document CH-A-659907. Such isolator is manufactured from a support made of laminated material and a continuous band made of an elastomeric material.

The outer surface of the support generally has a cylindrical, tapered, frusto-conical, "barrel-like" or any other revolution shape. The support is manufactured, for example, from wound mineral or organic fibers or threads, such as glass fibers, caked with a hardenable synthetic resin including epoxy resin.

The continuous band is obtained by extrusion. It is profiled so as to have, in section, a basis used as the contact surface with the support outer surface, an upper face provided with at least one flange extending transversally to the basis, a first and a second side surface which continue the basis by forming an angle therewith.

To manufacture the electric isolator, the profiled band is wound in several contiguous successive turns around the support by applying the basis of the band on to the support outer surface. When several turns are wound, the band forms a plurality of isolating annular flanges which protrude from the support.

Because of its higher resistance degree and its lower weight, such isolator is progressively used instead of conventional isolators made of porcelain.

According to this manufacturing method disclosed in the above-mentioned document, the first side surface is brought into juxtaposing contact with the second side surface of the band while the band is wound in contiguous turns. It is provided, however, to bond the two surfaces, namely using a two-compound glue "Araldite". More particularly, the two side surfaces of the profiled band are previously coated with glue and the band is then helically wound around the support. Coating glue on the two side surfaces has proved to be a very delicate operation because of the type of glue used. Further, uniformly coating the two surfaces with the above-mentioned glue while extruding the profiled band and winding it around the support proves very difficult. As a result, the two side surfaces are not always suitably assembled, which results in a risk of air trapping at the level of the slot created between the two side surfaces. Now, air trapping at the level of the isolator elastomeric coating simply must be avoided because of possible incandescent discharges. Besides, excess glue on side surfaces causes runouts on the outer surface of the elastomeric coating, which can hardly be eliminated by brushing or any other means. Further, rough patches always remain at the level of the outer surface of the elastomeric coating because of the presence of a joint between the annular flanges, since the slot created between the side surfaces is full of glue. Such rough patches are traps for polluting particles, namely dust from industrial rejects. Such dust will tend to accumulate and form a layer of non-isolating material. When this layer of material is humidified (by dew rain, sea spray, etc . . . ), it will be a continuous surface resistance short-circuiting the normal leakage path of the isolator, which is prejudicial to the isolating capacity expected from such an isolator.

The object of the invention is to remedy these drawbacks. More particularly, one object of the invention is to propose a method for manufacturing an electric isolator whose elastomeric coating has a relatively smooth surface, i.e. without joints between the annular flanges of the isolator.

Another object of the invention is to propose a method for manufacturing such isolator whereby a correct adherence of the profiled band made of elastomeric material is obtained on the isolator support so as to avoid any risk of air trapping.

Another object of the invention is to propose a method for manufacturing such electric isolator from an extrusion-profiled band made of elastomeric material whose upper face is provided with several flanges extending transversally at the band basis. More particularly, the method relates to the manufacturing of an electric isolator comprising annular flanges having different dimensions, following the example of conventional isolators made of porcelain comprising large dimension flanges alternating with smaller dimension flanges.

According to the invention, an electric isolator is thus manufactured from a support made of laminated material and a continuous band made of an elastomeric material wound in several contiguous successive turns so as to make an isolating coating in the form of a plurality of annular flanges. The continuous band is profiled so as to have, in section, a basis used as the contact surface with the support outer surface, an upper face provided with at least one flange extending transversally to the basis, a first and a second side surface which continue the basis by forming an angle therewith. The first side surface of the band is brought directly in superposing contact with the second side surface of the band during the winding of the band in turns and while leaving the elastomeric material raw at the level of the first and the second side surfaces and some pressure is applied towards the support on at least a portion of the upper face of the band along a slot created between the first and the second side surfaces, so as to assemble these two surfaces.

Other characteristics and advantages of the invention will be more evident when reading the following description of an exemplary embodiment of the invention.

Figure 1:
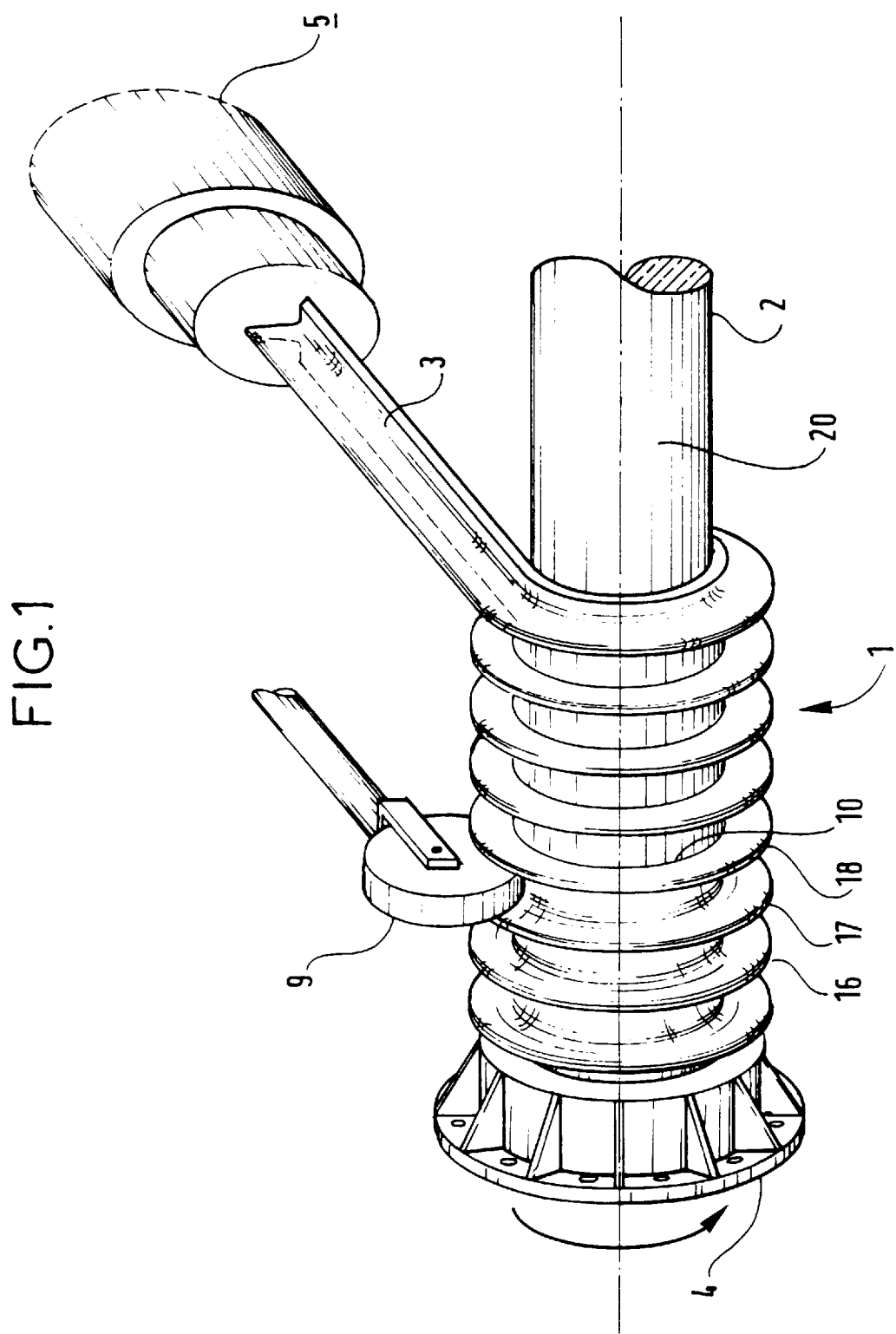
FIG. 1 illustrates the method for manufacturing an electric isolator according to the invention.

In FIG. 1, the electric isolator 1 is manufactured from a rigid support 2 used as an isolating frame and from a continuous band 3 made of elastomeric material helically wound around the support so as to make an isolating coating in the form of a plurality of annular flanges.

Support 2 is made of laminated material, for example, by winding glass fibers caked with a synthetic resin, like an epoxy resin. Here support 2 has a cylindrical outer surface 20 but other revolution shapes can be considered. At each end (only one is shown on the figure) the support is provided with an angle iron as 4, which is used as an anchoring element for the isolator.

The continuous band 3 is obtained through extruding 5 an elastomeric material, like silicone, ethylene propylene rubber or similar. Extrusion makes it possible to profile band 3. More particularly, in FIGS. 1 and 2, band 3 has in section, an upper face 32 provided with a flange 37 extending transversally, according to a certain angle, relatively to a basis 31 of the band. The basis 31 is used as the contact surface with the support outer surface 20. The band also has, in section, a first 33 and a second 34 side surface which continue the basis 31 by forming an angle therewith. It should be noted that the side surfaces 33 and 34 are preferably inclined along a similar angle of about 45° relatively to the basis 31 so that the two surfaces can be superposed when the band is wound in turns as mentioned below.

According to the invention, the profiled band 3 is helically wound around support 2 through the application of its basis 31 on the support outer surface 20 (inclusive of a portion of each angle iron outer surface). More particularly, the band 3 is extruded and at the same time wound in several contiguous successive turns 6, 7, 8 around its support rotatably driven around its longitudinal axis D and laterally moved along such axis D so as to make annular flanges 16, 17, 18 protruding from the support. When and as turns of the band are wound, the first side surface 33 is brought directly into superposing contact with the second side surface 34 of the band and a slot 10 is created between the two side surfaces helically winding around axis D of support 2. While the band is helically wound, the elastomeric material of the two side surfaces 33 and 34 is left raw, i.e. the two surfaces are not coated with a layer of glue or any other bonding material unlike the disclosure of the above-mentioned document.

It should be noted that the moving pitch of support 2 along axis D and the rotation velocity thereof around such axis are so adjusted that the first side surface 33 uniformly covers the second side surface 34 without any overlapping or shifting of turns.

While the band 3 is helically wound around support 2, some pressure, directed to the support, is applied on to the portion of the band 3 upper face 32 running along the helical slot 10 so as to assemble the two side surfaces 33 and 34 by mixing the band elastomeric material. Such pressure is applied preferably through rolling with a roller such as 9, thus following a helical path around support 2. The rolling with a roller makes it possible to eliminate the presence of a joint at the level of slot 10. Besides, rolling helps obtaining a suitable adherence of the band basis 31 on the support outer surface 20.

According to the invention, band 3 has a basis 31 provided with one or more longitudinal grooves 36 used for exhausting air all along the rolling operation so as to avoid air trapping between the elastomeric coating and the support. Such exhaust of air is all the more efficient as rolling is carried out as close as possible to the last turn around the support, i.e. during the winding of band 3 in turns.

Figure 2:
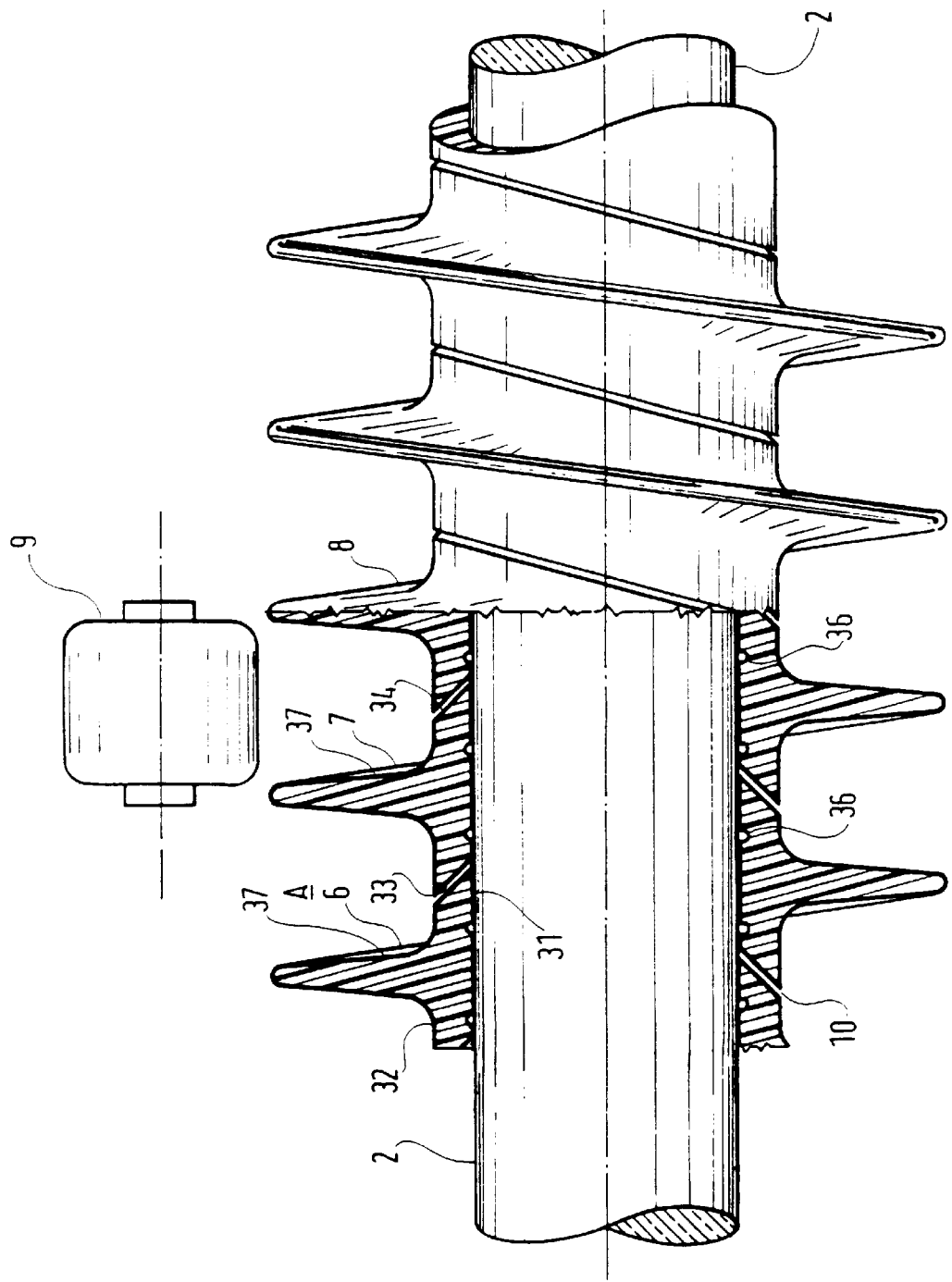
FIG. 2 shows a cross-sectional succession of turns, and the roller used during the manufacturing of the electric isolator.
Figure 3:
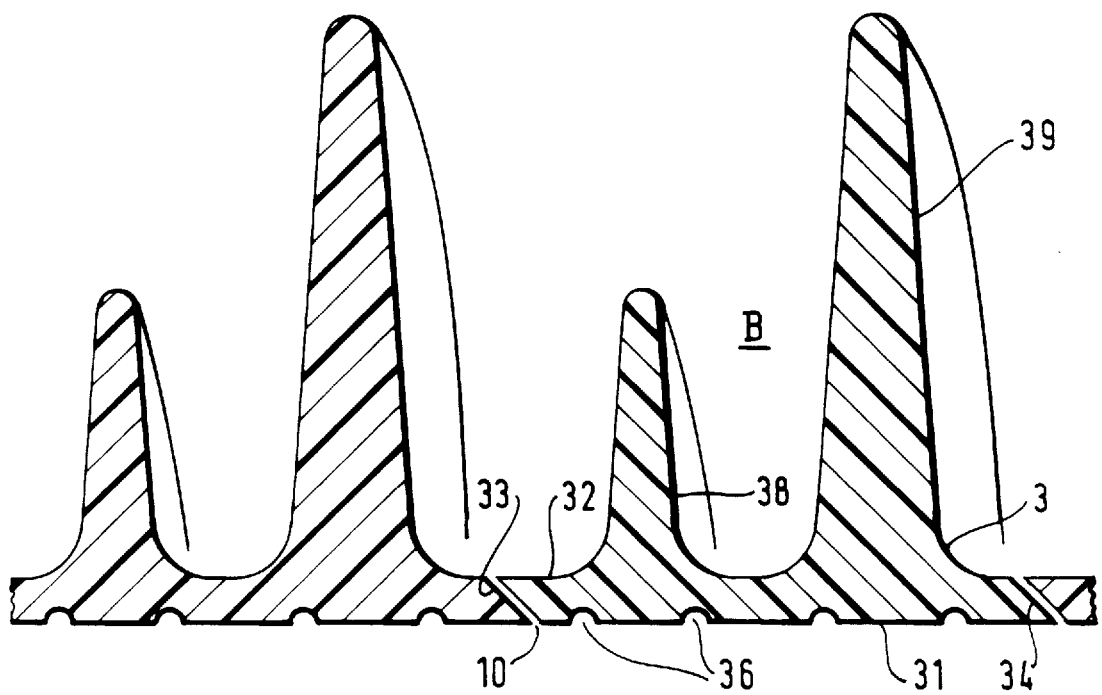
FIG. 3 shows a cross-sectional band whose upper face is provided with several flanges.
Figure 4:
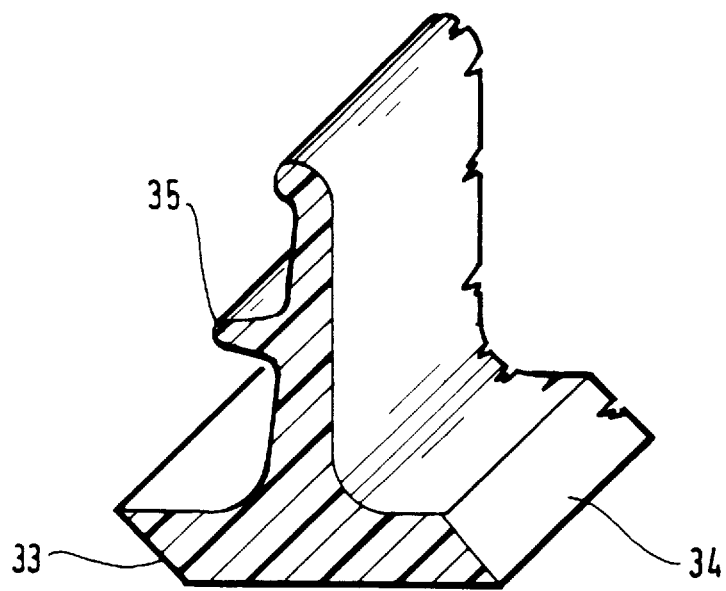
FIG. 4 shows a cross-sectional band whose upper face is provided with a flange with several ribs.

In FIG. 2, band 3 upper face 32 is provided with only one flange 37 which can further have one or more ribs, as shown in FIG. 4, resulting from extrusion. More particularly, in FIG. 4, the flange comprises a lower rib 35 used for increasing the leakage path of the isolator without increasing the outer diameter thereof (annular flange diameter). This flange also comprises, at its end, a so-called "tear-shaped" protuberance used for stimulating the running of water along the isolator. It should be noted that the principle of manufacturing of an isolator coating made of elastomeric coating by injection on a support (tube or rod) does not make it possible to obtain such ribbed isolation profiles. In the case of porcelain isolators, ribs must be machined, which makes the method more complex than that of the invention. When the band 3 is wound around the support, an isolator as shown in FIG. 1 is obtained. More particularly, an electric isolator comprising large dimension annular flanges alternating with smaller dimension annular flanges from a band 3 having, in section, an upper face provided with several flanges, for example, two flanges 38, 39 further having different dimensions along a transverse direction to basis 31, as shown in FIG. 3. It should be noted that the profile of a multi-flanged band results in an increased width of the band relatively to the profile of a single-flanged band. To avoid the risks of air trapping when band basis 31 is applied on to the support outer surface 20, a pressure is also applied, through rolling with a roller such as 9, on to the portion of the band upper face located between two contiguous flanges of this band (or two contiguous flanges of the same turn). It should also be noted that rolling on the various portions of the upper face of the band is preferably carried out through a system composed of several coaxial rollers acting on various areas of the band upper face.

It should be noted that roller 9, in FIG. 2, is wider (along an axial direction) than the gap (on the upper face 32) between two contiguous flanges which it rolls in. These flanges can belong to different turns, like gap A in FIG. 2 or belong to the same turn like gap B in FIG. 3. Pressing such a roller between two flanges results in flattening out the portion of the band located under each flange, which helps avoiding air trapping there. Besides, as can be seen in FIGS. 2 and 3, grooves 36 are located on the two sides of a flange 37, so that they can be flattened out by roller 9 during the rolling operation.

When the band is wound around the support and flattened out on the outer surface thereof through rolling, as mentioned above, the assembly is placed in an oven for vulcanising the elastomeric material. It should be noted that the support should preferably be kept rotating around its axis D during such vulcanisation operation, so as to avoid any warping of the annular flanges.

We claim:

1. A method for manufacturing an electric isolator (1) from a support (2) made of laminated material and a continuous band (3) made of elastomeric material wound in several contiguous successive turns (6, 7, 8) around the support, on an outer surface (20) thereof, in the form of a plurality of annular flanges (16, 17, 18), the continuous band being profiled to have, in section, a basis (31) used as a contact surface with the support outer surface, an upper face (32) provided with at least one flange extending transversally to the basis, a first (33) and a second (34) side surface which continue the basis by forming an angle therewith, characterised in that, the first side surface (33) of the band is brought directly into superposing contact with the second side surface (34) of the band during the winding of the band in turns, and while leaving the elastomeric material raw at the level of the first and the second side surfaces, and in that the joint between the first and the second side surfaces is eliminated by applying a pressure towards the support on at least a portion of the band upper face, whereby the elastomeric material of the band wound in turn is vulcanised.

2. A method according to claim 1, wherein said pressure is applied through rolling when and as the band (3) is wound around the support (2).

3. A method according to claim 1, wherein said pressure is applied through a rolling roller (9) which is wider than the gap between two contiguous flanges (16, 17) in different turns (6, 7).

4. A method according to claim 1, wherein a band (3) the basis (31) of which is provided with at least one longitudinal groove (36) is used as profiled band.

5. A method according to claim 4, wherein a band, the upper face (32) of which is provided with at least two flanges (38, 39) is used as profiled band.

6. A method according to claim 5, wherein a band, the upper face of which is provided with at least two flanges of different dimensions along a transverse direction to the band basis is used as profiled band.

7. A method according to claim 5, wherein said pressure is applied on a portion of the upper face between two contiguous flanges of the band, as well.

8. An electric isolator obtained through a method according to claim 1.

* * * * *